United States Patent
Ide et al.

(10) Patent No.: US 6,695,492 B2
(45) Date of Patent: Feb. 24, 2004

(54) OPTICAL MODULE AND PRODUCTION METHOD THEREFOR

(75) Inventors: Tsugio Ide, Nagato-machi (JP); Shojiro Kitamura, Nagano-ken (JP); Atsushi Harada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 138 days.

(21) Appl. No.: 09/818,866

(22) Filed: Mar. 28, 2001

(65) Prior Publication Data

US 2003/0081911 A1 May 1, 2003

(30) Foreign Application Priority Data

Mar. 30, 2000 (JP) .......................... 2000-095419

(51) Int. Cl.⁷ ................................................ G02B 6/36
(52) U.S. Cl. .......................................... 385/88; 385/52
(58) Field of Search ............................. 385/88, 2, 8, 14, 385/15, 25, 27, 52, 85, 90

(56) References Cited

U.S. PATENT DOCUMENTS

| | | | | |
|---|---|---|---|---|
| 5,881,198 A | * | 3/1999 | Haake | .......................... 385/136 |
| 6,253,011 B1 | * | 6/2001 | Haake | .......................... 385/52 |
| 6,394,666 B1 | * | 5/2002 | Minamino et al. | ............. 385/90 |
| 6,456,766 B1 | * | 9/2002 | Shaw et al. | .................... 385/47 |

FOREIGN PATENT DOCUMENTS

| | | | | |
|---|---|---|---|---|
| JP | 358195814 A | * | 11/1983 | ............ G02B/7/26 |
| JP | 363161408 A | * | 7/1988 | ............ G02B/6/42 |
| JP | 410111426 | * | 4/1998 | ............ G02B/6/24 |
| JP | A-10-148734 | | 6/1998 | |
| JP | A 11-44831 | | 2/1999 | |
| JP | A-2000-349307 | | 12/2000 | |

* cited by examiner

*Primary Examiner*—Frank G. Font
*Assistant Examiner*—Kevin C Kianni
(74) *Attorney, Agent, or Firm*—Oliff & Berridge, PLC

(57) ABSTRACT

The invention provides an optical module, in which a surface-emitting laser and an optical fiber are coupled, with the optical axes thereof crossed at a predetermined angle, at low cost. A supporting member supports the end of an optical fiber, in which the extending direction of a through hole and a face at the optical fiber end are orthogonal to each other. A surface-emitting laser and the supporting member are coupled by metal projections having different heights, so that a light-emitting face of the surface-emitting laser and the face of the supporting member are disposed so as to be opposed to each other at a predetermined angle. After the projections are formed on an electrode and metal patterns on the surface of the surface-emitting laser by a method based on wire bonding, the leading ends thereof are fixed to metal patterns of the supporting member by ultrasonic welding.

5 Claims, 5 Drawing Sheets

OPTICAL MODULE AND PRODUCTION METHOD THEREFOR

DETAILED DESCRIPTION OF THE INVENTION

1. Technical Field of the Invention

The present invention relates to an optical module in which an optical device (a surface-emitting laser or a surface-receiving photodiode) having a light-emitting face or a light-receiving face in parallel with a substrate surface is coupled to an optical fiber.

2. Description of the Related Art

In an optical transmitter module in which a laser and an optical fiber are coupled, light emitted from the laser is reflected by an end face of the optical fiber or the like and enters the laser, thereby producing external feedback noise. Japanese Unexamined Patent Application Publication No. 11-44831 discloses a method for reducing the external feedback noise in which the optical axis of light incident on the optical fiber and the optical axis of the optical fiber cross at a predetermined angle. For this reason, in a case in which the end face of the optical fiber is perpendicular to the longitudinal direction, the optical axis of light emitted from the laser and the optical axis of the optical fiber cross at a predetermined angle.

This publication discloses only a module as an embodiment in which an edge-emitting laser and an optical fiber are coupled. For this reason, the optical fiber is fixed, on the laser emission side, to the base to which the edge-emitting laser is fixed so that the laser-emitting face and the end face of the optical fiber are arranged at a predetermined angle. In general, in the module including the edge-emitting laser and the optical fiber coupled to each other, a groove is formed on the laser fixed side of the base and the optical fiber is fixed in the groove, thereby placing the laser-emitting face and the end face of the optical fiber so that they oppose each other.

[Problems to be Solved by the Invention]

However, the above publication dose not disclose any concrete method for making the optical axes of the surface-emitting laser and the optical fiber cross at a predetermined angle in the module having the surface-emitting laser and the optical fiber coupled to each other.

Accordingly, an object of the present invention is to provide an optical module in which an optical device (a surface-emitting laser or a surface-receiving photodiode) having a light-emitting face or a light-receiving face in parallel with a substrate surface is coupled to an optical fiber and in which the optical axes thereof cross at a predetermined angle, and to provide a method for producing the optical module at low cost.

[Means for Solving the Problems]

In order to overcome the above problems, the present invention provides an optical module including an optical device having a light-receiving face or a light-emitting face in parallel with a substrate surface, an optical fiber, and a supporting member for supporting the end of the optical fiber, wherein the supporting member has a through hole for passing the end of the optical fiber therethrough, a face of the supporting member at the optical fiber end and the extending direction of the through hole are orthogonal to each other, the light-receiving face or the light-emitting face of the optical device and the face of the supporting member at the optical fiber end are placed opposed to each other at a predetermined angle so as not to be parallel to each other, and the optical device and the supporting member are coupled by an angle-maintaining member for maintaining the angle and are placed so that the optical axes thereof cross at a predetermined angle.

It is preferable that the angle-maintaining member be formed of a projection, and more particularly, of a conductive projection. This projection can be formed by, for example, the following method based on wire bonding. First, a metal wire made of gold or the like is passed through a capillary of a wire bonding apparatus, and the leading end of the metal wire is melted by an electric torch or the like, thereby forming a metal ball. Next, the capillary is moved down toward a metal face where a projection is to be formed, and the metal ball is thermally bonded to the metal face by thermocompression bonding. The capillary is then pulled up, and the metal wire is cut at the root of the metal ball. A metal projection shaped like a rivet is thereby formed on the metal face. The projection may be formed by, for example, forming a layer made of a conductive material on the surface of a projection made of an insulating material. A concrete example of a method for obtaining such a projection includes the steps of jetting liquid synthetic resin into the form of a projection by an ink jet method or the like, curing the liquid synthetic resin, and forming a conductive layer by metallising the surface of the projection. In particular, since the ink jet method makes it possible to easily form projections of various sizes, the height of the projection can be adjusted easily.

It is preferable that the angle-maintaining member be made of a light-transmissive material and be formed of a block member having an inclined face corresponding to a preset angle between the light-receiving face or the light-emitting face of the optical device and the face of the supporting member at the optical fiber end. The light-transmissive material is, for example, polyimide resin, polymethyl metacrylate, or ultraviolet-curing resin.

The present invention also provides a production method for an optical module in which an optical device having a light-receiving face or a light-emitting face in parallel with a substrate surface and an optical fiber are coupled to each other, wherein a supporting member for supporting the end of the optical fiber has a through hole for passing the end of the optical fiber therethrough and a face at the optical fiber end which is orthogonal to the extending direction of the through hole, and wherein the optical axis of the optical device and the optical axis of the optical fiber cross at a predetermined angle by passing the end of the optical fiber through the through hole of the supporting member after the optical device and the supporting member are coupled by an angle-maintaining member so that the light-receiving face or the light-emitting face of the optical device and the face of the supporting member at the optical fiber end are placed opposed to each other at a predetermined angle so as not to be parallel to each other.

[Description of the Embodiments]

Embodiments of the present invention will be described below.

FIG. 1 is a cross-sectional view of an optical module according to a first embodiment of the present invention. This figure corresponds to cross-sectional views taken, respectively, along line a—a in FIG. 2 and line b—b in FIG. 3, which will be described later.

This optical module is an optical transmitter module primarily comprising a surface-emitting laser (optical device) 1, an optical fiber 2, a supporting member 3 for supporting the end of the optical fiber 2, projections 41, 42, 43, and 44 made of Au, a base 5, and a semiconductor chip 8. The end face of the optical fiber 2 is formed perpendicularly to the optical axis of the optical fiber 2 (center line of a core).

The supporting member 3 has, at the center of its rectangular parallelepiped shape, a through hole 31 of circular cross section, and both opened end faces of the supporting member 3 in the extending direction of the through hole 31 are orthogonal to the extending direction (center axis of the circular cross section). Accordingly, a face 32 of the supporting member 3 at the optical fiber end is orthogonal to the extending direction of the through hole 31. The diameter of the through hole 31 is set to be slightly larger than that of the optical fiber 2.

Therefore, the end of the optical fiber 2 is supported by the supporting member 3 by being passed through the through hole 31 of the supporting member 3. In this state, the end face of the optical fiber 2 is in parallel with the face 32 of the supporting member 3 at the optical fiber end.

FIG. 2 is a plan view of the face 32 of the supporting member 3 at the end of the optical fiber. As shown in this figure, the face 32 of the supporting member 3 at the optical fiber end is square, and rectangular metal patterns 33 are formed at four corners of the face 32. The four metal patterns 33 serve as positioning members in the supporting member 3.

The supporting member 3 is fixed to the base 5 via a wiring pattern 6. A pair of upper and lower metal layers 34 and 35 are formed on the surface (lower surface) of the supporting member 3 placed on the base 5 and the opposite surface (upper surface). These metal layers 34 and 35 are formed to be connected to a pair of upper and lower metal patterns 33. The semiconductor chip 8 is also fixed to the base 5 with an adhesive 7. The semiconductor chip 8 is provided with a driving circuit and the like for the surface-emitting laser 1. An electrode 81 formed on the semiconductor chip 8 is connected to the metal layer 35 on the upper surface of the supporting member 3 by wire bonding with a metal wire 82.

FIG. 3 is a plan view of the front surface (emitting-side surface) of the surface-emitting laser 1. On the front surface of the surface-emitting laser 1, a cylindrical light-emitting portion 11 is formed at the center, and an electrode 12 and metal patterns 13 are also formed thereon. An electrode 14 is formed on the back surface (surface on the side opposite from the emitting side) of the surface-emitting laser 1. The electrode 14 is connected to the upper metal patterns 33 of the supporting member 3 by wire bonding with a metal wire 83.

The front-side electrode 12 is composed of a contact portion 12a for surrounding a light-emitting aperture 11a, a nearly square pad portion 12b formed outside the aperture, and a connecting portion 12c for connecting both the portions. The metal patterns 13 have almost the same shape as that of the pad portion 12b of the electrode 12 and are formed at three positions, as shown in FIG. 3. The three metal patterns 13 and the pad portion 12b of the electrode 12 serve as positioning members in the surface-emitting laser 1 corresponding to the four metal patterns 33 of the supporting member 3.

The surface-emitting laser 1 is fixed to the face 32 of the supporting member 3 by the Au projections 41 and 42 formed between the positioning members of the surface-emitting laser 1 and the supporting member 3 (between the metal patterns 13 and the metal patterns 33) in a state in which "the light-emitting face 11a" or "the front surface of the surface-emitting laser 1" and the face 32 of the supporting member 3 are not placed in parallel with each other, but are opposed to each other so as to form a predetermined angle α therebetween. In accordance with the angle α, the height of the projections 41 disposed above the through hole 31 of the face 32 of the supporting member 3 is set to be larger than that of the projections 42 disposed therebelow. These projections 41 and 42 correspond to angle-maintaining members.

In addition to the projections 41 and 42, Au projections 43 and 44 are formed at the edges of the metal patterns 13 of the surface-emitting laser 1 on the side of the light-emitting portion 11 by the above-described method based on wire bonding method. The projections 43 and 44 are arranged at the positions inside the through hole 31 of the supporting member 3 (that is, the positions inside the end face of the optical fiber 2 and outside the core). The heights of the projections 43 and 44 are set so that a predetermined distance is ensured between the end face of the optical fiber 2 and "the light-emitting face 11a" or "the front surface of the surface-emitting laser 1" of the surface-emitting laser 1 when the end face of the optical fiber 2 passed through the through hole 31 of the supporting member 3 abuts against the projections 43 and 44.

For example, the surface-emitting laser 1 and the supporting member 3 are coupled by the projections 41 and 42 in the following manner.

First, the projections 41 to 44 are formed at the positions on the metal patterns 13 of the surface-emitting laser 1 by the above-described method based on wire bonding. In this case, the projections are formed to have the heights in accordance with the angle α, as described above. Next, the surface-emitting laser 1 and the supporting member 3 are positioned by image recognition utilizing the metal patterns 13 of the surface-emitting laser 1 and the metal patterns 33 of the supporting member 3. Two-dot chain lines in FIG. 2 show the positional relationships of the surface and the projections 41 and 42 of the surface-emitting laser 1 with the face 32 of the supporting member 3.

When positioning is completed, the projections 41 and 42 of the surface-emitting laser 1 and the metal patterns 33 of the supporting member 3 are heated and ultrasonically welded while the projections 41 and 42 are pressed against the metal patterns 33 by a predetermined force. The projections 41 and 42 and the metal patterns 33 are thereby joined to each other. As a result, the surface-emitting laser 1 and the supporting member 3 are coupled with the predetermined angle α therebetween.

Adjustment of the angle α using the projections can be performed by changing the sizes of metal balls when forming the projections 41 and 42 and changing the number of forming processes of the metal balls. Furthermore, the heights of the projections 41 and 42 can be adjusted in accordance with the above-described angle α by forming the projections 41 and 42 to have the same height and making a difference between the forces of pressing of the projection 41 and the projection 42 against the face 32 of the supporting member 3. The heights of the projections 43 and 44 can also be adjusted in a similar manner.

After the surface-emitting laser 1 is fixed to the supporting member 3 in this way, the optical fiber 2 is passed through the through hole 31 of the supporting member 3, and the end face of the optical fiber 2 is put into contact with the projections 43 and 44. The optical axis L1 of the surface-emitting laser 1 and the optical axis L2 of the optical fiber 2 are thereby crossed each other, and the crossing angle β thereof becomes equal to the angle α formed between the surface of the light-emitting portion 11 and the face 32 of the supporting member 3. Moreover, a predetermined distance is ensured between the end face of the optical fiber 2 and "the light-emitting face 11a" or "the front surface of the surface-emitting laser 1" of the surface-emitting laser 1.

The angle between the optical axis L1 of the surface-emitting laser 1 and the optical axis L2 of the optical fiber 2 is not in consideration of the balance of the amount of light reflected from the end face of the optical fiber 2 and the optical coupling efficiency of the optical fiber 2 (the rate of the amount of light transmitted through the optical fiber to the amount of light incident on the optical fiber).

As described above, this embodiment provides an optical module serving as an optical transmitter module in which the surface-emitting laser 1 and the optical fiber 2 are coupled and the optical axes thereof cross at the predetermined angle β. This reduces external feedback noise in the optical transmitter module.

Another method for crossing the optical axes of the surface-emitting laser and the optical fiber at a predetermined angle is to use a supporting member in which the extending direction of a through hole and the face at the optical fiber end are placed at oblique angles to each other, to fix the end of the optical fiber having the inclined end face by passing the end through the through hole, and to thereby place the inclined face opposed to the light-emitting face of the surface-emitting laser. However, the supporting member having such a structure increases the costs because it is difficult to work the through hole into an inclined shape.

In contrast, this embodiment adopts the supporting member 3 for supporting the end of the optical fiber 2, in which the extending direction of the through hole 31 thereof is orthogonal to the face 32 at the optical fiber end. Since the supporting member 3 with this structure can be easily produced by molding or machining using plastic or ceramic, the costs can be substantially reduced.

Furthermore, in this optical module, the surface-emitting laser 1 and the supporting member 3 are coupled by metal projections which are formed by the method based on wire bonding. For this reason, the optical module can be easily produced at low cost.

In this optical module, the end face of the optical fiber 2 and the surface-emitting laser 1 are prevented from contacting with each other by forming the projections 43 and 44. The number of projections formed for that purpose is not always limited to two, and may be, for example, one.

FIG. 4 is a cross-sectional view of an optical module according to a second embodiment of the present invention. This figure corresponds to cross-sectional views taken, respectively, along line a—a in FIG. 2 and along line A–C in FIG. 5 which will be described later.

This optical module is an optical transmitter module which principally comprises a surface-emitting laser (optical device) 1, a block member 15 formed on the front surface (aperture-side surface) of the surface-emitting laser, an optical fiber 2, a supporting member 30 for supporting the end of the optical fiber 2, a base 5, and a semiconductor chip 8. The end face of the optical fiber 2 is at right angles to the optical axis (the center line of the core) thereof.

The supporting member 30 has, at the center of its rectangular parallelepiped shape, a through hole 31 of circular cross section, and both opened end faces thereof in the extending direction of the through hole 31 is orthogonal to the extending direction (center axis of the circular cross section). Accordingly, a face 32 of the supporting member 30 at the optical fiber and is orthogonal to the extending direction of the through hole 31. The diameter of the through hole 31 is set to be slightly larger than that of the optical fiber 2.

Therefore, the end of the optical fiber 2 is supported by the supporting member 30 by being passed through the through hole 31 of the supporting member 30. In this state, the end face of the optical fiber 2 is in parallel with the face 32 of the supporting member 30 at the optical fiber end.

The face 32 of the supporting member 30 at the optical fiber end is the same as in the first embodiment. That is, as shown in FIG. 2, the face 32 of the supporting member 30 at the optical fiber end is square, and rectangular metal patterns 33 are formed at four corners of the face 32. The four metal patterns 33 serve as positioning members in the supporting member 3.

The supporting member 30 is fixed to the base 5 via a wiring pattern 6. The length of the supporting member 30 in the longitudinal direction of the optical fiber 2 is set to be larger than that of the supporting member 3 in the first embodiment. Metal layers 34 connected to the above-described positioning metal patterns 33 and independent metal layers 36 are formed on a face (lower surface) of the supporting member 30 disposed on the side of the base 5.

The semiconductor chip 8 is fixed to the upper surface of the supporting member 30. For this reason, metal patterns 35 connected to the above-described positioning metal patterns 33 and an independent metal layer 37 are formed on the upper surface of the supporting member 30. These metal layers 35 and 37 and the semiconductor chip 8 are connected by electrodes 38.

The surface-emitting laser 1 is fixed to the face 32 of the supporting member 30 via the block member 15 and metal patterns 13 while "a light-emitting face 11a" or "the front surface of the surface-emitting laser 1" thereof and the face 32 of the supporting member 30 are placed opposed to each other with a predetermined angle α therebetween so as not to be parallel to each other.

FIG. 5 is a plan view showing the front side of the surface-emitting laser 1. A cylindrical light-emitting portion 11 is formed at the center of the front surface of the surface-emitting laser 1, and an electrode 12 is also formed thereon. The electrode 12 is composed of a contact portion 12a for surrounding a light-emitting aperture 11a, a nearly square pad portion 12b formed outside the aperture, and a connecting portion 12c for connecting the above portions.

An electrode 14 is formed on the back surface (the surface opposite from the light-emitting surface) of the surface-emitting laser 1. The electrode 14 is connected to the upper metal patterns 33 of the supporting member 30 by wire bonding using a metal wire 83.

The block member 15 made of a light-transmissive material is formed on the front surface of the surface-emitting laser 1, and the light-emitting portion 11 and the electrode 12 are formed under the block member 15. Four metal patterns 13 are formed on the upper surface of the block member 15. An electrode 16 is also formed at a position corresponding to the pad portion 12b of the electrode 12 so as to extend through the block member 15.

For example, the block member 15 can be produced in the following manner. This manner will be described with reference to FIG. 6. FIGS. 6(a) and 6(b) are cross-sectional views taken along line A–B in FIG. 5, and FIGS. 6(c) and 6(d) are cross-sectional views taken along line A–C in FIG. 5.

First, as shown in FIG. 6(a), a resin layer 15a having a thickness approximately 1.5 times the height of the light-emitting portion 11 is made of photosensitive polyimide resin on the front surface of the surface-emitting laser 1. Next, a contact hole 15b is formed at a position in the resin layer 15a on the pad portion 12b of the electrode 12. The contact hole 15b is formed by, for example, transferring a hole pattern onto the resin layer 15a by a photolithographic process and then performing a dry etching process.

Subsequently, the electrode 16 is formed by depositing an electrode material, such as aluminum, in the contact hole 15b. This state is shown in FIG. 6(b). Next, the upper surface of the resin layer 15a is ground into an inclined shape corresponding to a preset angle α (angle between the light-emitting face 11a and the face 32 of the supporting member 30). The block member 15 having a face inclined corresponding to the preset angle α is thereby formed on the front surface of the surface-emitting laser 1. FIG. 6(c) shows this state.

Next, as shown in FIG. 6(d), four metal patterns 13 are formed on the upper surface of the block member 15 in a planar form shown in FIG. 5. These metal patterns 13 are almost the same in shape as the pad portion 12b of the electrode 12 and are formed at four positions, as shown in FIG. 5. The four metal patterns 13 are formed to have a uniform thickness. The four metal patterns 13 serve as positioning members in the surface-emitting laser 1 corresponding to the four metal patterns 33 of the supporting member 30.

One of the four metal patterns 13A is formed on the pad portion 12b of the electrode 12 via the block 15, and is connected to the pad portion 12b by the electrode 16. That is, the metal pattern 13A serves as both the electrode and the positioning member in the surface-emitting laser 1.

For example, the surface-emitting laser 1 and the supporting member 30 are coupled in the following manner. First, the surface-emitting laser 1 and the supporting member 30 are positioned by image recognition using the metal patterns 13 of the surface-emitting laser 1 and the metal patterns 33 of the supporting member 30. When positioning is completed, the metal patterns 13 and the metal patterns 33 are joined by an conductive adhesive.

After the surface-emitting laser 1 is thus fixed to the supporting member 30, the optical fiber 2 is passed through the through hole 31 of the supporting member 30, and the end face of the optical fiber 2 is put into contact with the inclined face of the block member 15. The optical axis L1 of the surface-emitting laser 1 and the optical axis L2 of the optical fiber 2 are thereby crossed. The crossing angle β thereof becomes equal to the angle α formed between the face of the light-emitting portion 11 and the face 32 of the supporting member 30.

As described above, this embodiment provides an optical module serving as an optical transmitter module in which the surface-emitting laser 1 and the optical fiber 2 are coupled to each other and the optical axes thereof cross at the predetermined angle β. For this reason, this optical transmitter module reduces external feedback noise.

This embodiment adopts the supporting member 30 for supporting the end of the optical fiber 2 in which the extending direction of the through hole 31 thereof is orthogonal to the face 32 at the optical fiber end. Since the supporting member 30 having this structure can be easily produced by molding or machining using plastic or ceramic, the cost can be made lower than the supporting member in which the extending direction of the through hole is at oblique angles to the face at the optical fiber end.

In order to mass-produce such optical modules, first, it is preferable to first form an array member in which a plurality of surface-emitting lasers 1 and a block member 15 having a plurality of inclined faces corresponding to the surface-emitting lasers 1 are combined, to cut the array member into parts corresponding to the surface-emitting lasers 1, and to fix each cut part to the supporting member 30.

As a concrete example, a plurality of surface-emitting lasers 1 are first formed on a substrate in the form of an array, and a resin layer is formed on the laser array. Next, the resin layer is cured in a state in which a die of serrate cross section is pressed against the surface of the resin layer, thereby serrating the surface of the resin layer so that a plurality of inclined faces for the surface-emitting lasers 1 are formed continuously. Next, contact holes and metal patterns, such as electrodes, are formed in the cured resin layer. By then cutting the array member corresponding to the respective surface-emitting lasers 1, a structure shown in FIG. 6(d) is obtained.

While the optical transmitter module having one surface-emitting laser 1 and one optical fiber 2 has been described in these embodiments, the present invention is also applicable to an optical module in which multiple surface-emitting lasers and optical fibers are arranged in an array. In this case, for example, it is preferable to use an array member, in which a plurality of surface-emitting lasers and a block member having a plurality of inclined faces corresponding thereto are combined, as described above, without cutting the array member, and to fix the array member to a supporting member having a plurality of through holes for optical fibers.

While the optical transmitter module using the surface-emitting laser as the optical device has been described in these embodiments, the present invention is also applicable to an optical receiver module in which a surface-receiving photodiode and an optical fiber are coupled. In such an optical receiver module, external feedback noise also occurs due to the returning of light, which is reflected by a light-receiving face of the photodiode, to a laser on the light-source side via the optical fiber. The external feedback noise is, however, reduced by crossing the optical axis of the optical fiber and the optical axis of the photodiode, as in the present invention.

[Advantages]

As described above, the present invention makes it possible to provide, at low cost, an optical module in which an optical device (a surface-emitting laser or a surface-receiving photodiode) having a light-emitting face or a light-receiving face in parallel with a substrate surface is coupled to an optical fiber and in which the optical axes thereof cross at a predetermined angle.

BRIEF DESCRIPTION OF THE DRAWINGS

FIG. 1 is a cross-sectional view of an optical module according to a first embodiment of the present invention.

FIG. 2 is a plan view of a face at the optical fiber end of a supporting member which constitutes the optical module shown in FIG. 1.

FIG. 3 is a plan view showing the front surface (aperture-side surface) of a surface-emitting laser which constitutes the optical module shown in FIG. 1.

FIG. 4 is a cross-sectional view of an optical module according to a second embodiment of the present invention.

FIG. 5 is a plan view showing the front surface (aperture-side surface) of a surface-emitting laser which constitutes the optical module shown in FIG. 4.

FIG. 6 is a cross-sectional view showing a method for forming a block member constituting the optical module shown in FIG. 4.

REFERENCE NUMERALS

Figure 1:
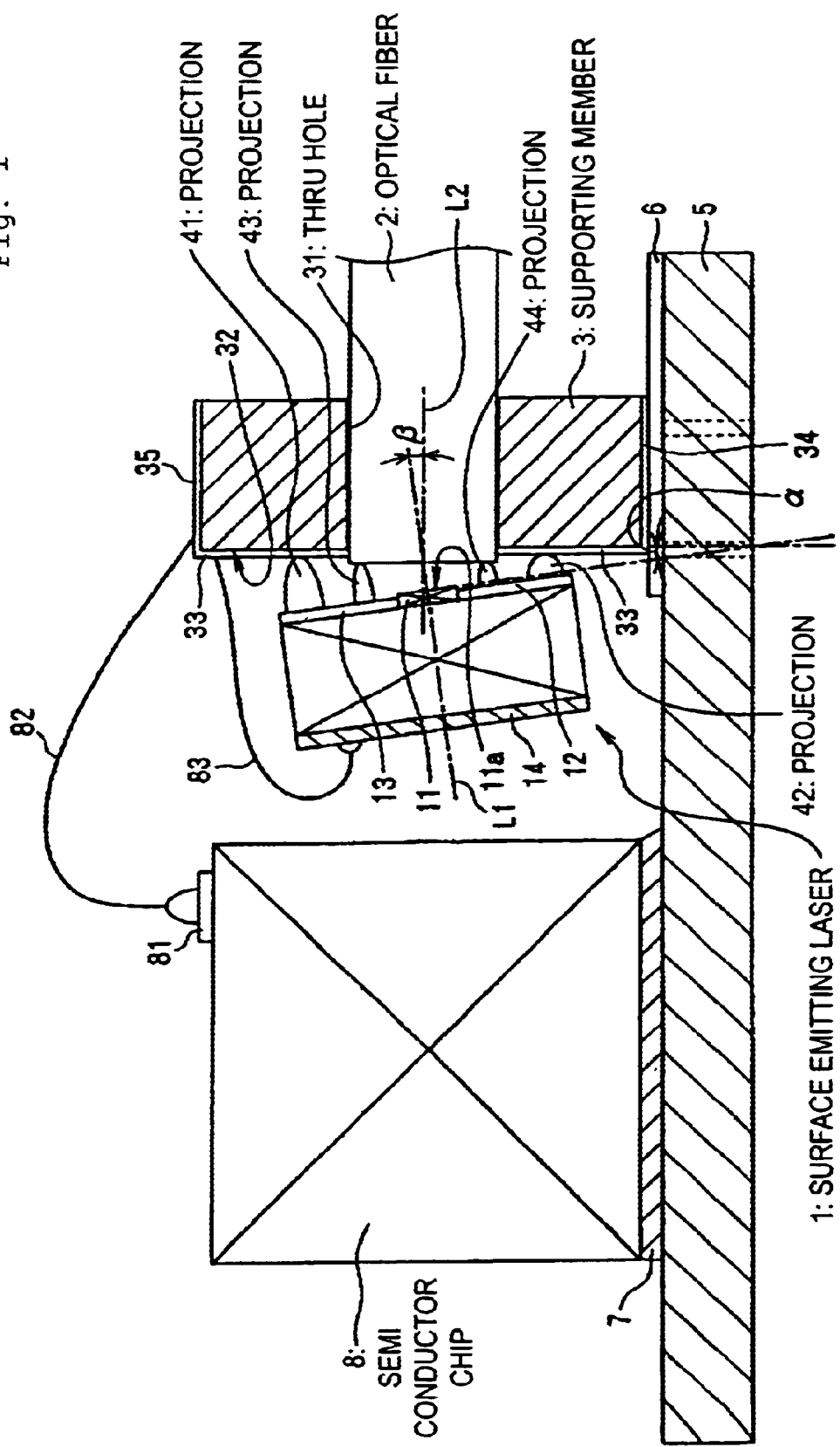
[FIG. 1]
Figure 2:
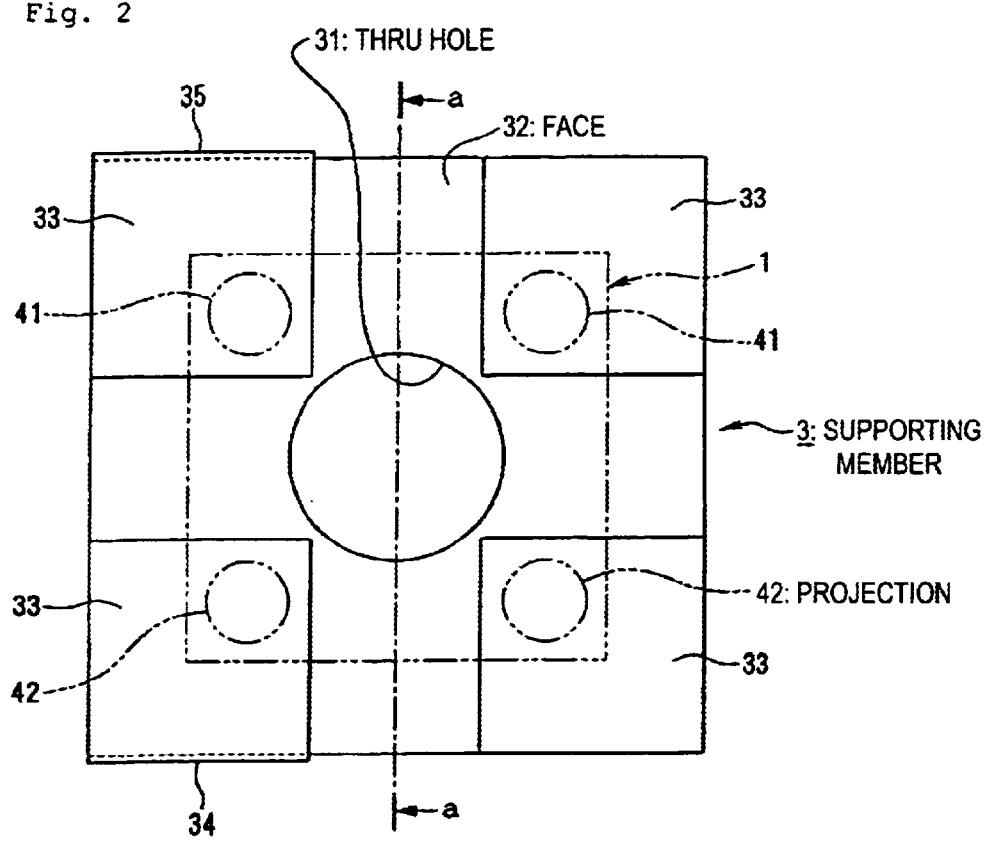
[FIG. 2]
Figure 3:
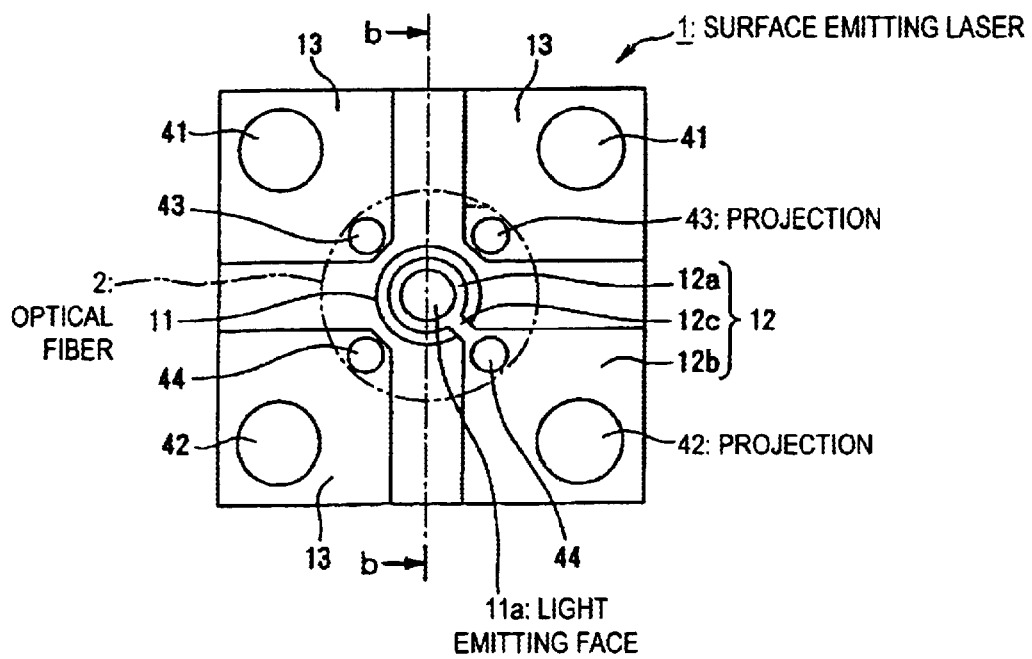
[FIG. 3]
Figure 4:
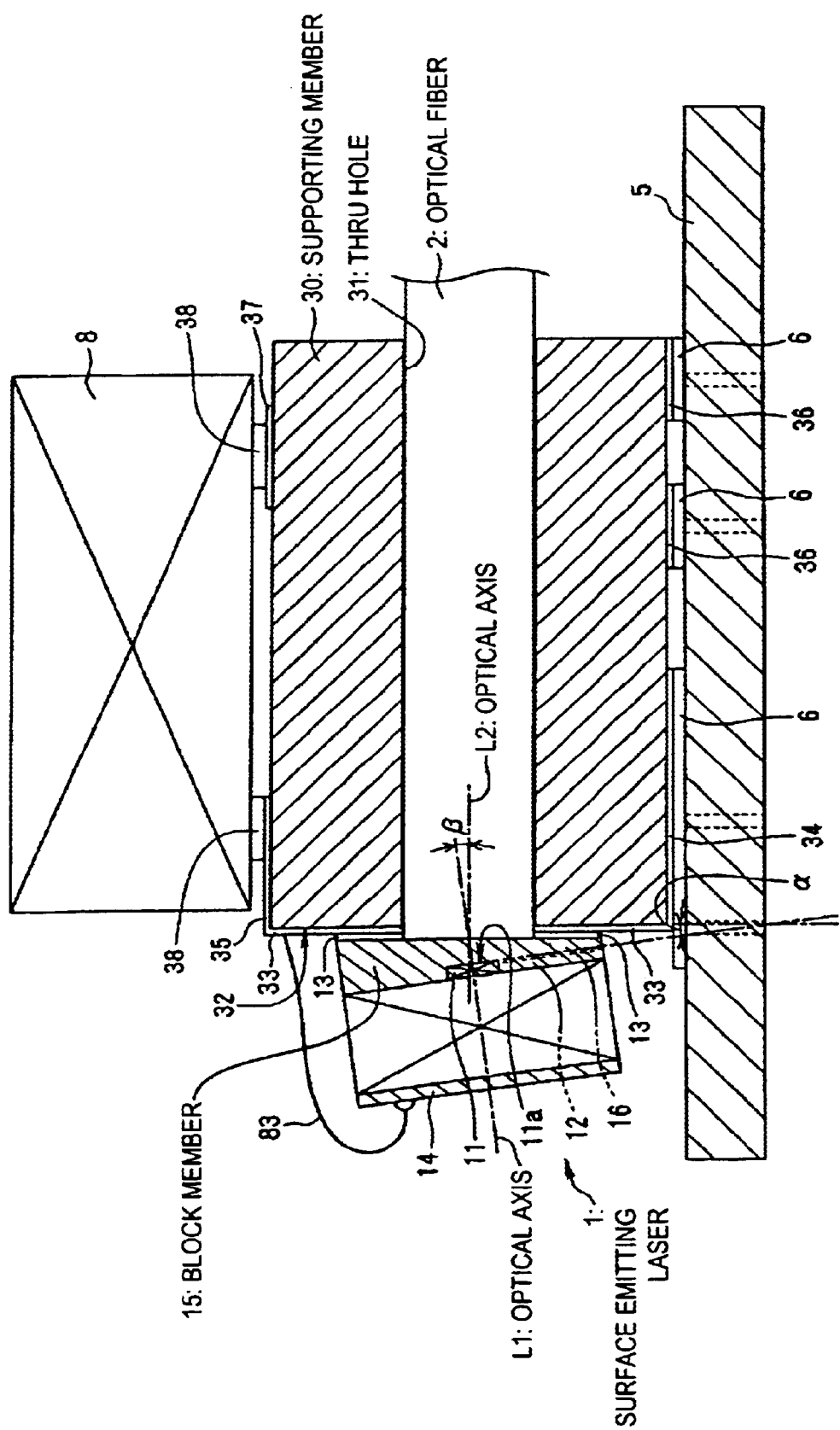
[FIG. 4]
Figure 5:
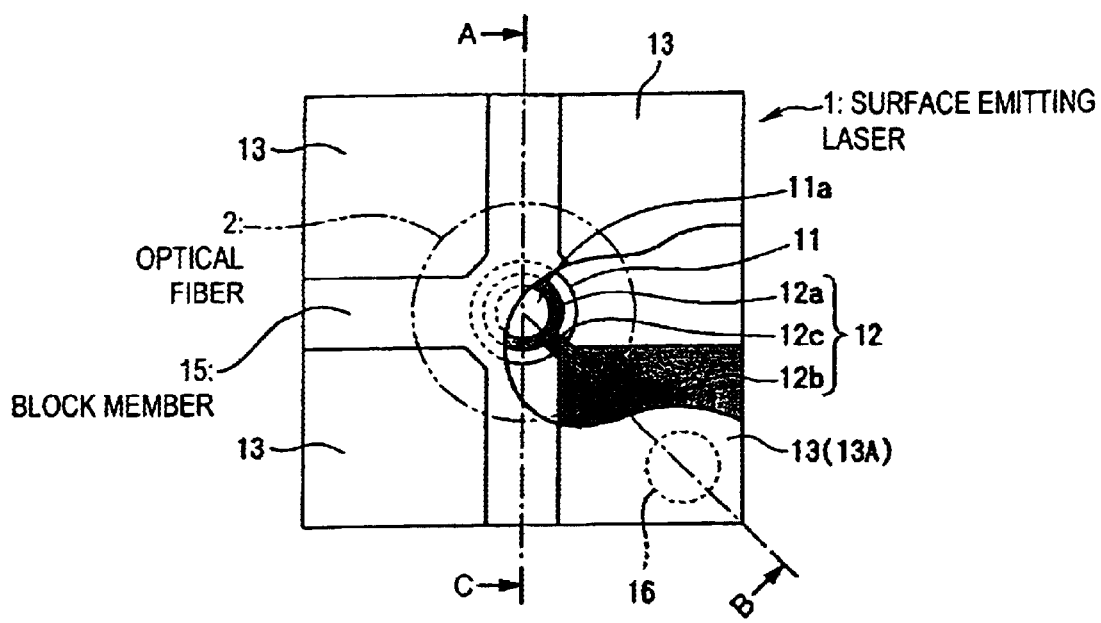
[FIG. 5]
Figure 6:
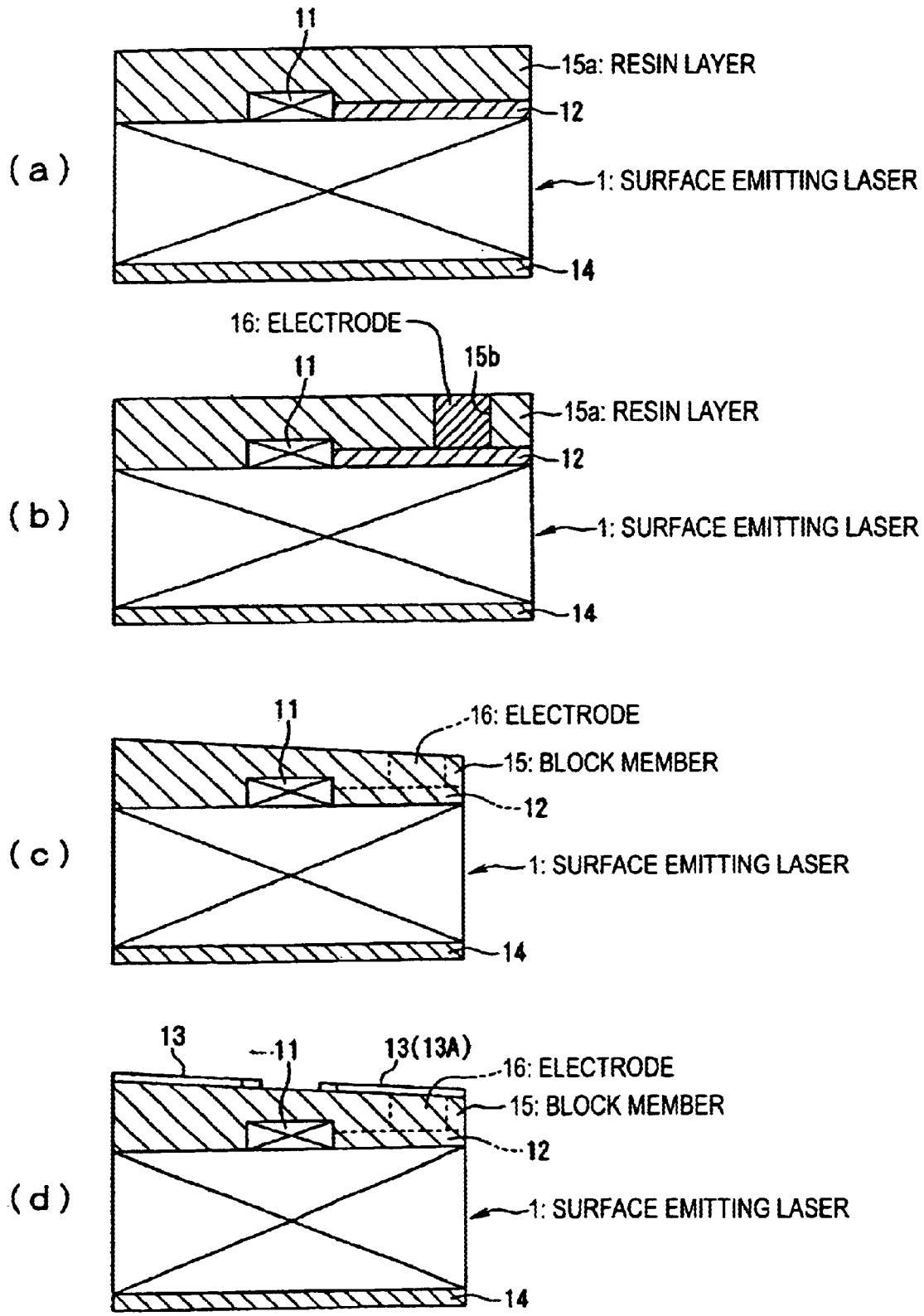
[FIG. 6]

1: surface-emitting laser (optical device)
11: light-emitting portion
11a: light-emitting aperture
12: electrode
12a: contact portion
12b: pad portion
12c: connecting portion
13: metal pattern for positioning
14: electrode
15: block member (angle-maintaining member)
15a: resin layer
15b: contact hole
16: electrode
2: optical fiber
3: supporting member
30: supporting member
31: through hole of supporting member
32: face of supporting member at the optical fiber end
33: metal pattern for positioning
34: metal layer
35: metal layer
36: metal layer
37: metal layer
38: electrode
41: projection (angle-maintaining member)
42: projection (angle-maintaining member)
43: projection
44: projection
5: base
7: adhesive
8: semiconductor chip
81: electrode
82: metal wire
83: metal wire
L1: optical axis of surface-emitting laser
L2: optical axis of optical fiber
α: angle formed between light-emitting face and face of supporting member at the optical fiber end
β: crossing angle of optical axes

What is claimed is:

1. An optical module, comprising:
a substrate surface;
an optical device having at least one of a light-receiving face and a light-emitting face that is parallel to the substrate surface;
at least one optical fiber having an end;
a plurality of projections, a plurality of metal patterns and an electrode having a plurality of pad portions formed on the light emitting face; and
a supporting member that supports the end of said optical fiber, said supporting member having at least one through hole, the end of said optical fiber being extendible through the through hole, said supporting member having a face at the optical fiber end that extends in a direction that intersects an extending direction of said through hole, said at least one of the light-receiving face and the light-emitting face of said optical device and said face of said supporting member at the optical fiber end being disposed opposed to each other at a predetermined angle so as not to extend parallel relative to each other, said optical device and said supporting member being coupled by the plurality of projections that maintain the predetermined angle, the optical device and the supporting member being placed so that optical axes of the optical device and the optical fiber intersect at the predetermined angle, the plurality of metal patterns and the plurality of pad portions serving as position members.

2. The optical module according to claim 1, said plurality of projections being made of a conductive material.

3. The optical module according to claim 1, the plurality of projections having a surface that is covered with a layer made of a conductive material.

4. An optical module, comprising:
a substrate surface;
an optical device having at least one of a light-receiving face and a light-emitting face that is parallel to the substrate surface, the light emitting face having a plurality of metal patterns and an electrode with a plurality of pad portions formed thereon;
at least one optical fiber having an end;
an angle maintaining member; and
a supporting member that supports the end of said optical fiber, said supporting member having at least one through hole, the end of said optical fiber being extendible through the through hole, said supporting member having a face at the optical fiber end that extends in a direction that intersects an extending direction of said through hole,
said at least one of the light-receiving face and the light-emitting face of said optical device and said face of said supporting member at the optical fiber end being disposed opposed to each other at a predetermined angle so as not to extend parallel relative to each other, said optical device and said supporting member being coupled by the angle maintaining member that maintains the predetermined angle, the optical device and the supporting member being placed so that optical axes of the optical device and the optical fiber intersect at the predetermined angle, the plurality of metal patterns and the plurality of pad portions serving as position members, and
said angle-maintaining member being made of a light-transmissive material and being formed of a block member having a face inclined corresponding to the predetermined angle defined between the at least one of the light-receiving face and the light-emitting face of said optical device and said face of said supporting member at the optical fiber end.

5. A method for manufacturing an optical module, the optical module including a substrate surface, an optical device having at least one of a light-receiving face and a light-emitting face that is parallel to the substrate surface, the light emitting face having a plurality of metal patterns and an electrode with a plurality of pad portions formed thereon an optical fiber having an end, a supporting member that supports the end of said optical fiber, the supporting member having a through hole, the end of said optical fiber being extendible through the through hole, the supporting member having a face at the optical fiber end that extends in a direction that intersects an extending direction of said through hole, and a plurality of projections formed on the light emitting face, the method comprising the steps of:

coupling the optical device and the supporting member with the plurality of projections, a plurality of metal patterns and an electrode having a plurality of pad portions; and intersecting an optical axis of said optical device and an optical axis of said optical fiber at a predetermined angle by extending the end of said optical fiber through said through hole of said supporting member after said optical device and said supporting member are coupled by the plurality of projections so that the at least one of said light-receiving face and said light-emitting face of said optical device and said face of said supporting member at the optical fiber end are disposed so as to be opposed relative to each other at the predetermined angle so as not to extend parallel relative to each other.

* * * * *